US009846929B2

(12) United States Patent
Zou

(10) Patent No.: US 9,846,929 B2
(45) Date of Patent: Dec. 19, 2017

(54) FAST DENSITY ESTIMATION METHOD FOR DEFECT INSPECTION APPLICATION

(71) Applicant: Hong Kong Applied Science and Technology Research Institute Company Limited, Hong Kong (HK)

(72) Inventor: Weiwen Zou, Hong Kong (HK)

(73) Assignee: Hong Kong Applied Science and Technology Research Institute Company Limited, Hong Kong (CN)

( * ) Notice: Subject to any disclaimer, the term of this patent is extended or adjusted under 35 U.S.C. 154(b) by 0 days.

(21) Appl. No.: 15/079,062

(22) Filed: Mar. 24, 2016

(65) Prior Publication Data

US 2017/0278235 A1    Sep. 28, 2017

(51) Int. Cl.
    *G06K 9/00*    (2006.01)
    *G06T 7/00*    (2017.01)
    (Continued)

(52) U.S. Cl.
    CPC .............. *G06T 7/0008* (2013.01); *G06K 9/62* (2013.01); *G06K 9/66* (2013.01); *G06T 5/002* (2013.01);
    (Continued)

(58) Field of Classification Search
    CPC ....... G01N 2021/8854; G01N 21/8851; G01N 21/95607; G01N 2021/9513; G01N 21/95; G01N 2021/95646; G01N 2021/95669; G01N 21/95684; G06T 7/001; G06T 7/0004; G06T 2207/30141; G06T 2207/30148; G06T 7/13; G06T 7/30; G06T 7/32; G06T 7/0002; G06T 2207/10056; G06T 2007/30121; G06T 7/0008; G06T 2207/30152; H04N 1/4074; H04N 5/335;
    (Continued)

(56) References Cited

U.S. PATENT DOCUMENTS 5,057,921 A * 10/1991 Robert .................... H04N 7/014
                                                                348/439.1
5,153,444 A * 10/1992 Maeda .............. G01N 21/95607
                                                                250/559.05
(Continued)

FOREIGN PATENT DOCUMENTS

JP        09199560 A        7/1997
JP        2008196951 A      8/2008

OTHER PUBLICATIONS

Yan Zheng, et al. Quality and Efficiency in Kernel Density Estimates for Large Data, SIGMOD'13, Jun. 22-27, 2013, New York, New York, USA.

(Continued)

*Primary Examiner* — Aklilu Woldemariam
(74) *Attorney, Agent, or Firm* — Norton Rose Fulbright US LLP

(57) ABSTRACT

The present invention provide a high speed spatial density estimation algorithm to estimate defect density maps for blob analysis in an image processing field for inspection. The method of the present invention uses a rotated L1 epsilon-ball neighborhood mask for determining a defect density for each of target pixels to generate a defect density map for defect detection of an object. The present method is capable of providing high detection speed and substantially eliminating influence of the noise from images.

20 Claims, 8 Drawing Sheets

(51) Int. Cl.
*G06K 9/66* (2006.01)
*G06T 5/30* (2006.01)
*G06T 5/00* (2006.01)
*G06K 9/62* (2006.01)

(52) U.S. Cl.
CPC .................. *G06T 5/30* (2013.01); *G06K 9/00* (2013.01); *G06T 2207/20036* (2013.01); *G06T 2207/20081* (2013.01)

(58) Field of Classification Search
CPC ........... H04N 1/00031; H04N 1/00034; H04N 1/00039; H04N 1/00045; H04N 19/513; H04N 19/521; H04N 1/3878; H04N 1/4092; H04N 2201/0005; H04N 2201/0094; G06K 15/025; G06K 15/027; G06K 9/036; G06K 9/4638; G06K 9/56; G06K 9/60; B23K 2201/40; B23K 3/08
USPC ....... 382/190, 141, 143–152, 173, 256, 263, 382/264, 265
See application file for complete search history.

(56) References Cited

U.S. PATENT DOCUMENTS

| | | | |
|---|---|---|---|
| 5,485,532 A * | 1/1996 | Ishihara | G06T 7/0006 382/141 |
| 5,619,588 A * | 4/1997 | Yolles | G06T 7/001 382/149 |
| 7,149,344 B2 | 12/2006 | Prince | |
| 8,995,747 B2 | 3/2015 | Xu et al. | |
| 2001/0012394 A1 * | 8/2001 | Yoshida | G01N 21/95607 382/149 |
| 2002/0049560 A1 * | 4/2002 | Fujieda | G06T 7/0004 702/167 |
| 2002/0063893 A1 * | 5/2002 | Fujieda | G06T 7/0004 358/1.15 |
| 2006/0067570 A1 * | 3/2006 | Onishi | G06T 7/001 382/147 |
| 2006/0067571 A1 * | 3/2006 | Onishi | G06T 7/001 382/149 |
| 2006/0092264 A1 * | 5/2006 | Matsuzaki | G03G 15/326 347/233 |
| 2006/0245636 A1 * | 11/2006 | Kitamura | G06K 9/00 382/149 |
| 2007/0288219 A1 * | 12/2007 | Zafar | G03F 1/84 703/14 |
| 2010/0329566 A1 | 12/2010 | Nikula et al. | |
| 2011/0019245 A1 * | 1/2011 | Adachi | H04N 1/00002 358/448 |
| 2015/0243018 A1 * | 8/2015 | Vajaria | G06T 7/0004 382/133 |
| 2016/0313651 A1 * | 10/2016 | Middlebrooks | G03F 7/705 |

OTHER PUBLICATIONS

International Search Report and Written Opinion issued for PCT Application No. PCT/CN2016/077650 dated Dec. 28, 2016.

* cited by examiner

US 9,846,929 B2

FAST DENSITY ESTIMATION METHOD FOR DEFECT INSPECTION APPLICATION

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of image processing and, more particularly, to image analysis for defect inspection.

BACKGROUND

Defect inspection in manufacturing is conducting inspection during the production process. This approach of inspection helps control the quality of products by fixing the sources of defects immediately after they are detected, and it is useful for any factory that wants to improve productivity, reduce defect rates, and reduce re-work and waste. The measurement of defect information is usually conducted on component texture information or height information. In conventional methods, we usually measure and consider the local defect distribution to determine if the area has defects or not.

Many advanced image processing applications call for estimating the spatial density of blob in a binary image. One of the applications is to remove the noise blobs from the defect blobs in defect inspection. In such case, the blobs region with low density will be considered as noise and other regions will be considered as defects. By using this technology, the user can easily distinguish the defect regions from a low contrast and rough surface. Along these lines, automatic optical inspection (AOI) for rough surface can be realized.

However, the density estimation is always almost based on window searching algorithms, in which the algorithm need to do a full searching to estimate the density for each spatial location (that the pixel location). For instance, for an image of W×H size, the complexity of the existing searching based algorithm is $O(W*H*\epsilon 2)$, wherein $\epsilon 2$ is the size of the neighborhood which may be the searching window, O represents computation complexity. We can find that the complexity increases dramatically when $\epsilon 2$ increase (2 order of increasing magnitude). In vision inspection application with high precision, the window size is always large, e.g. 50×50, which is the corresponding complexity will be 100 times larger than in the case of 5×5. Along these lines, the blob density estimation will be slowed down and the high speed inspection will suffer from this low speed estimation algorithm.

There is a need in the art to have a high speed spatial density estimation algorithm to estimate defect density maps for binary large object (blob) analysis in image processing field for inspection.

SUMMARY OF THE INVENTION

Accordingly, the presently claimed invention provides a fast density estimation method for defect inspection.

In accordance to an embodiment of the presently claimed invention, a method for inspecting one or more defects of an object by using defect density estimation, the method comprises: capturing one or more images of the object; estimating defect response from the one or more captured images; generating a binary matrix comprising one or more defect elements based on the estimated defect response; determining a first neighborhood mask for each of target pixels of the one or more captured image based on a predetermined neighborhood radius; determining a second neighborhood mask by rotating the first neighborhood mask through a predetermined angle; determining a defect density for each of the target pixels within the second neighborhood mask based on the binary matrix; and determining the defects of the object based on the determined defect densities of the target pixels.

Preferably, each of the one or more captured images is a 2-dimension gray intensity image, a color image, a depth image, or a binary image.

Preferably, the binary matrix is generated by a thresholding method.

Preferably, the thresholding method includes a method, which converts a matrix to a binary matrix.

Preferably, the thresholding method includes an adaptive thresholding method or a traditional thresholding method.

Preferably, each of the one or more defect elements is a non-zero element.

Preferably, each of the one or more defect elements is a zero element.

Preferably, the first neighborhood mask is a first L1 epsilon-ball neighborhood mask.

Preferably, the predetermined neighborhood radius is a Manhattan distance between the target pixel and any point at an edge of the first neighborhood mask.

Preferably, the predetermined neighborhood radius is an optimal neighborhood radius calculated based on input defect image data of the object and a prediction model.

Preferably, the prediction model is determined by conducting a data-fusion process and a regression based learning process.

Preferably, the predetermined neighborhood radius is an optimal neighborhood radius determined through a machine learning based process.

Preferably, the machine learning based process comprises conducting a data-fusion process and a regression based learning process to generate a prediction model; and calculating the optimal neighborhood radius based on data of the one or more captured images and the prediction model.

Preferably, the predetermined angle is an angle of 45 degree, 135 degree, 225 degree, or 315 degree.

Preferably, the defect density is determined by counting the defect elements of the binary matrix.

Preferably, the method further comprises generating a defect density map based on the determined defect densities of the target pixels for determining the defects of the object, and classifying noise of the one or more captured images from the defect density map to output a defect image.

Preferably, the method further comprises classifying defect pixels and noise pixels from the one or more captured images based on the determined defect densities of the target pixels to output a defect image; and post-processing the defect image with one or more morphological operations or blob filtering in terms of a geometric size, an area of connected pixels, or an aspect to reduce the noise pixels.

Preferably, the one or more morphological operations include eroding, dilating, opening, and/or closing in digital image processing context.

Preferably, the step of classifying the defect pixels and the noise pixels is done with one or more defect density images based on the determined defect densities of the target pixels.

BRIEF DESCRIPTION OF THE DRAWINGS

Embodiments of the present invention are described in more detail hereinafter with reference to the drawings, in which.

DETAILED DESCRIPTION

In the following description, a method for inspecting one or more defects of an object by using defect density estimation is set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

In the light of the foregoing background, it is an object of the present invention to provide a spatial density estimation algorithm to estimate defect density map for defect inspection.

Figure 1:
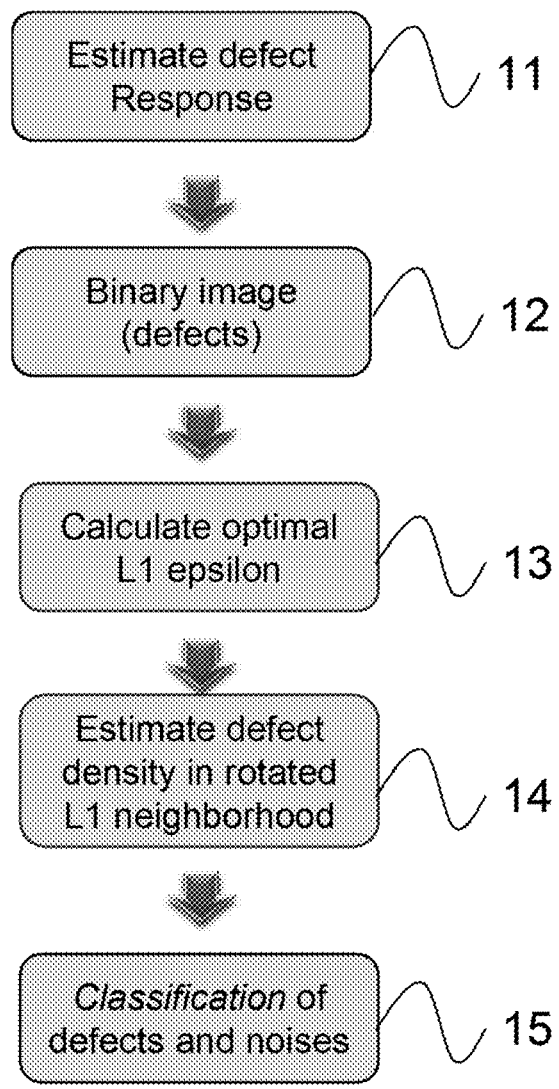
FIG. 1 is a flowchart of a density estimation method for defect inspection, according to one embodiment of the present invention.
Figure 2A:
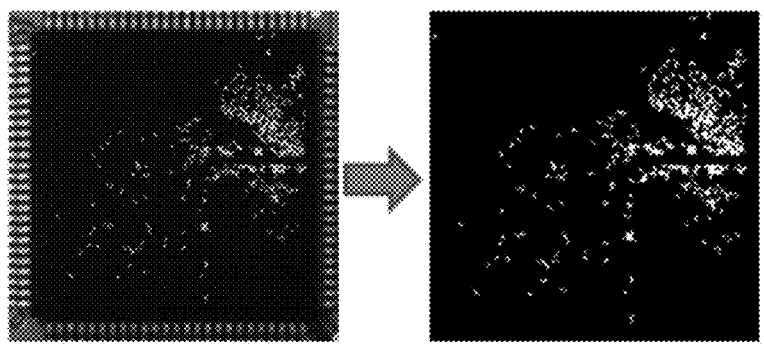
FIG. 2A illustrates the conversion between the captured image and the corresponding binary image, according to one embodiment of the present invention.

FIG. 1 is a flowchart of a density estimation method for defect inspection, according to one embodiment. As shown in FIG. 1, the step 11 is to capture one or more images for defect estimation on a surface of an object. In one embodiment, images are sequentially captured as blocks on the surface of the object. In the step 12, the captured image is converted into a binary matrix for density estimation. FIG. 2A illustrates the conversion between the captured image and the corresponding binary image, according to one embodiment. As shown in FIG. 2A, the pixels in white represent for defects and/or noises, and the pixels in black mean good areas. In an alternative embodiment, the pixels representing defects and/or noises could be set as black and pixels representing good areas could be set as white.

In the step 13, an optimal neighborhood value (∈), which is used for determining a neighborhood mask for each defect/noise pixel of the binary matrix, is calculated through a machine learning based process. In the step 14, for each pixel of the binary matrix, a first neighborhood mask is calculated based on the optimal neighborhood value L1. After that, a second neighborhood mask is determined by rotating the first neighborhood mask through a predetermined angle. The defect density for the corresponding pixel could be then estimated within the second neighborhood mask.

Figure 2B:
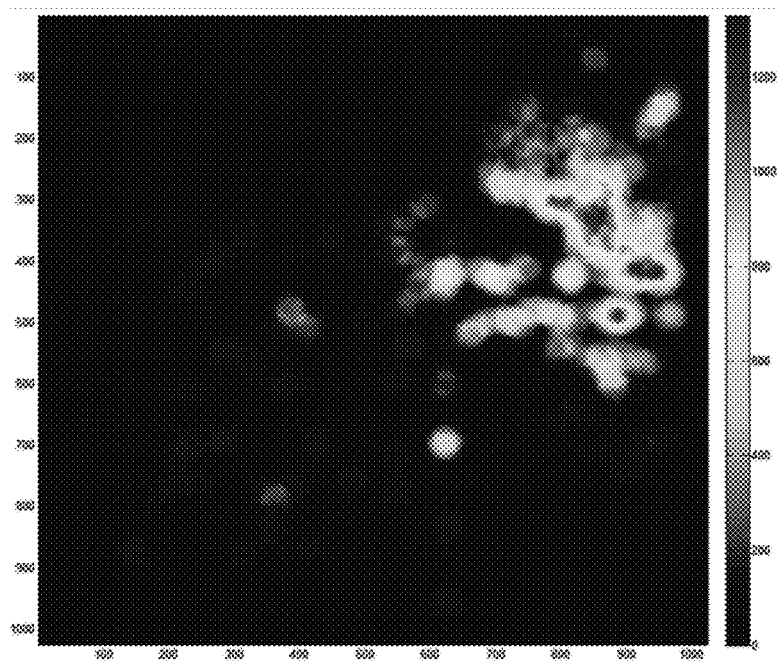
FIG. 2B illustrates a defect density map estimated by using the proposed neighborhood mask, according to one embodiment of the present invention.

After defect density for all the pixels are determined through the step 14, a defect density map, as shown in FIG. 2B, could be created to distinguish real defect from noise, in the step 15.

In an alternative embodiment, only defect density for at least partial of the pixels in the binary matrix, i.e., only the defect/noise pixels need to be calculated to form the defect density map.

Following is the detailed description on the step 13 and the step 14.

Figure 3A:
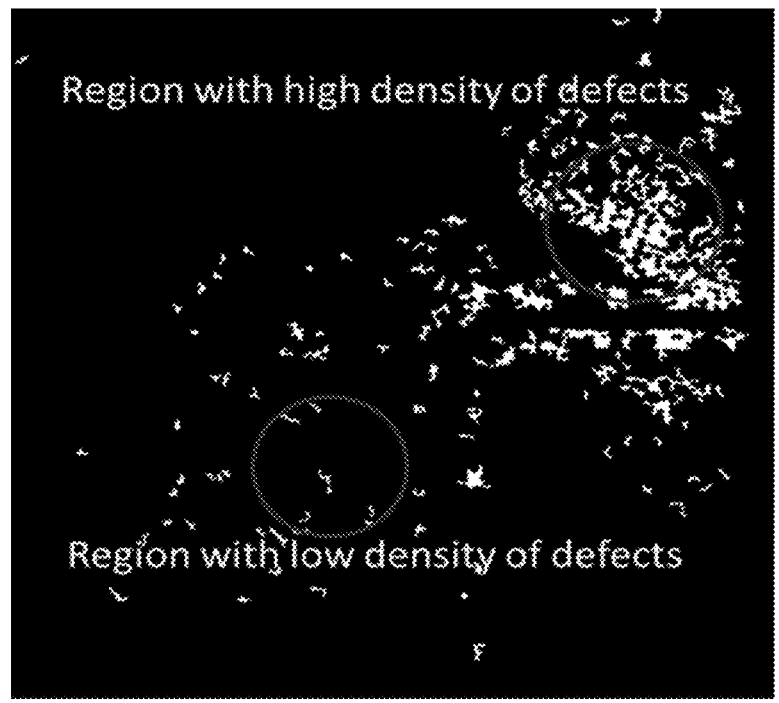
FIG. 3A depicts a binary matrix with defect/noise pixels distributed inside.

Density of defects represents a local characteristic of defect pixels in the spatial domain. It's always about counting number/average number of the defect pixels in a neighborhood patch which centered around a certain pixel. Normally density of defect is related to the nature of distribution of defect pixels. FIG. 3A depicts a binary matrix with defect/noise pixels distributed on a surface of interest. As shown in FIG. 3A the region with high density of defects refers to real defection. The region with low density of defects refers to noise, i.e., dust. As such, it is necessary to determine a defect density map for the binary matrix to classify which are real defect pixels and which are noises.

Figure 3B:
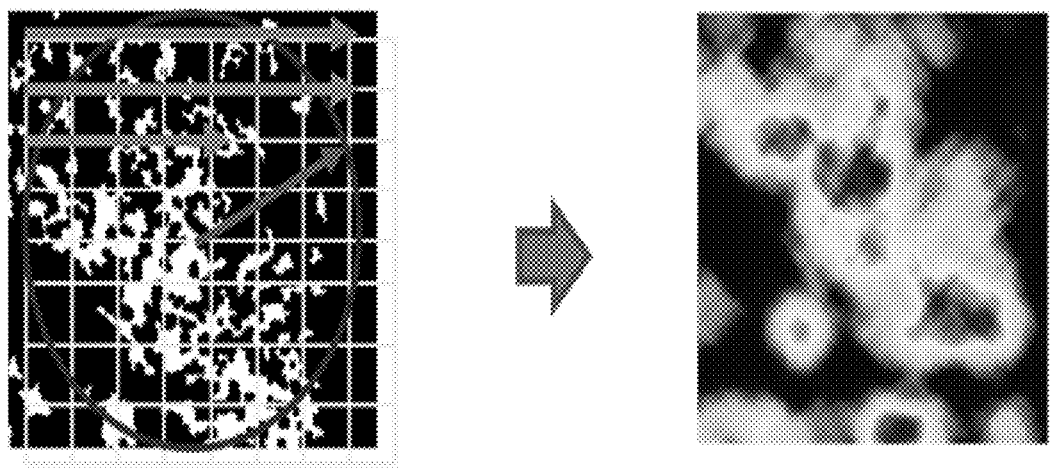
FIG. 3B depicts generation from a binary matrix to a defect density map by using a circle neighborhood, according to a prior art.

Under such condition, a window search method could be used to estimate the defect density and generate the defect density map. In a conventional method, for every pixel of the binary matrix, a circle neighborhood mask is always used for window search to estimate the defect density within the mask area around a pixel. FIG. 3B depicts the generation from the binary matrix to the defect density map by using the circle neighborhood according to a prior art method. As shown in FIG. 3B, after defining the circle neighborhood mask, the defect density within the mask could be calculated by counting number/average number of the defect pixels within the bounding area. After defect density of all the pixels have been calculated, a defect density map could be generated based on the calculated defect density.

However, by using this method, computational complexity for defect density (denoted as d(i,j) of pixel (i,j)) is relatively high as shown below:

$$d(i, j) = \sum_{(n,m) \in N(i,j)} I(n, m) = \sum_{n=-\epsilon}^{\epsilon} \sum_{m=-\epsilon}^{\epsilon} I(i+n, j+m) \times K(n, m)$$

$$\mathbb{N}(i, j) = \left\{ (n, m) \mid \sqrt[2]{(n-i)^2 + (m-j)^2} < \varepsilon \right\} K(n, m) = \begin{cases} 1, \|(n, m)\|_2 < \epsilon \\ 0, \|n, m\|_2 \geq \epsilon \end{cases}$$

where i and j represent the coordinates of the pixel, ∈ represents the radius of the circle mask, I means the defect response (e.g. a binary image matrix or a gray level image which the intensity represents the defect degree), K means the kernel matrix for density estimation (usually it is a square matrix of width and height of 2∈, and it represents a ball shape), N means the neighborhood of the pixel (it is represented as kernel mask in digital image context). For pixel (i,j) the complexity is $O(\epsilon^2)$.

In the present invention, an optimized neighborhood value is used to create a neighborhood mask, and the computational complexity will be significantly decreased as explained below.

Figure 4A:
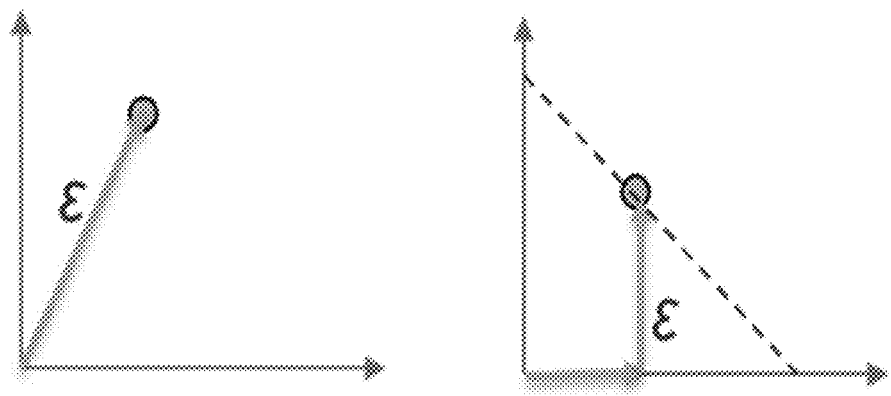
FIG. 4A illustrates the comparison for neighborhood boundary between the circle mask and the first neighborhood mask.
Figure 4B:
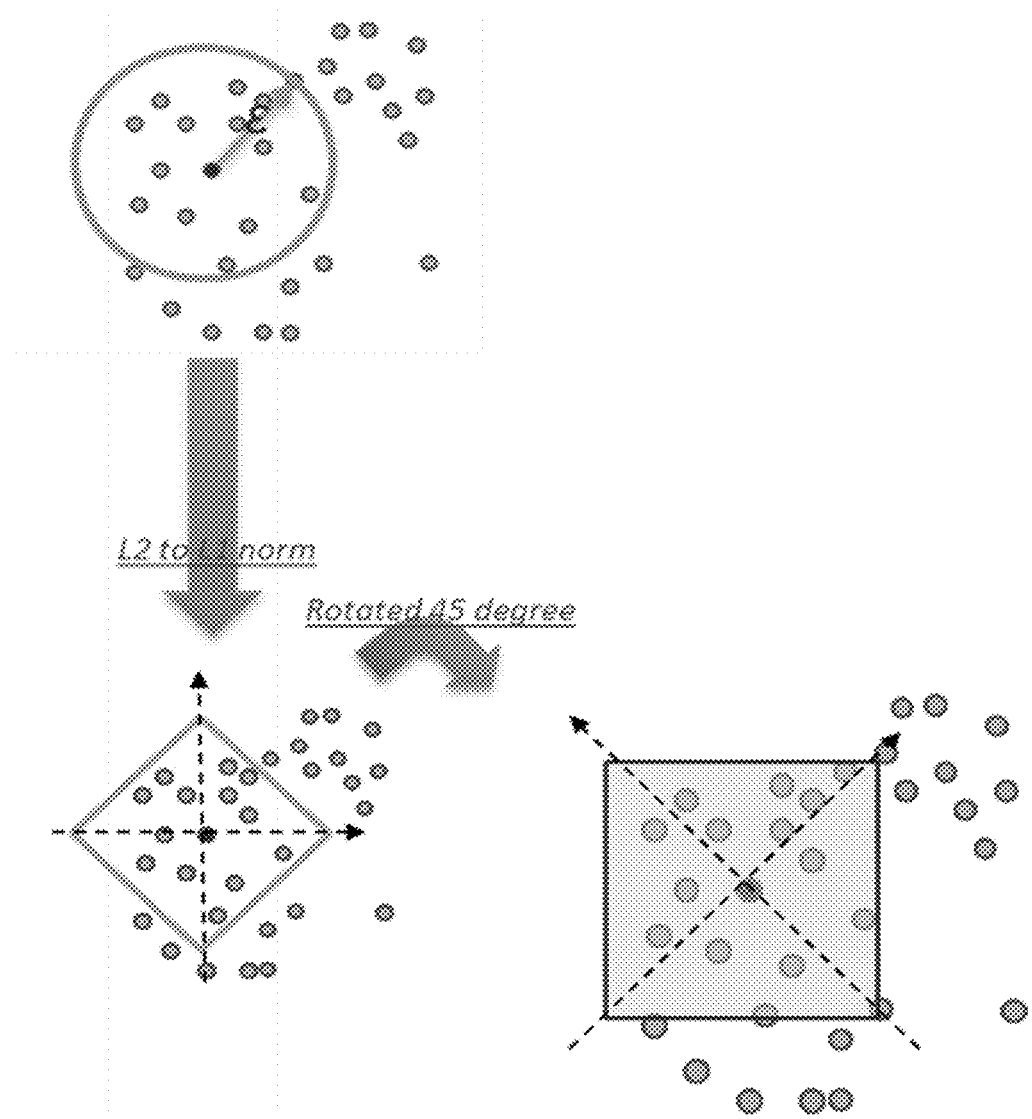
FIG. 4B depicts the rotation from the first neighborhood mask to the second neighborhood mask according to one embodiment of the present invention.

In one embodiment, for each pixel of the binary matrix, a first neighborhood mask is calculated based on the neighborhood value $\epsilon$. In one embodiment, the pixel could be the center of the first neighborhood mask. And the first neighborhood mask is determined that a Manhattan distance between a center and any point at the edge of the mark is equal to the neighborhood value $\epsilon$. FIG. 4A illustrates the comparison for neighborhood boundary between the circle mask and the first neighborhood mask. As shown on the right side of FIG. 4A, by using the Manhattan distance to define the neighborhood mask, the mask could be a diamond shape, instead of the circle shape on the left. After that, a second neighborhood mask is determined by rotating the first neighborhood mask around a predetermined angle. In one embodiment, the second neighborhood mask could be determined by rotating the first neighborhood mask around 45 degree, 135 degree, 225 degree, or 315 degree. In general, the predetermined angle can be (45+n×90) degree, where n is any integer. FIG. 4B depicts the rotation from the first neighborhood mask to the second neighborhood mask. After the rotation, the final mask could be a square shape mask as shown on the right side of FIG. 4B. The defect density for the corresponding pixel could be then estimated within the second neighborhood mask.

Under such condition, the defect density is given by the following equation:

$$d(i, j) = \sum_{(n,m) \in N(i,j)} I(n, m) = \sum_{n=-\epsilon}^{\epsilon} \sum_{m=-\epsilon}^{\epsilon} I(i+n, j+m)$$

$$N(i, j) = \{(n, m) \mid |n - i| < \mathcal{E}', |m - j| < \mathcal{E}'\}$$

where i and j represent for the coordinates of the pixel, $\epsilon$ represents for the rotated Manhattan distance between the center and any point at the edge of the mark.

Apparently, the computational complexity is significantly simplified by using L1 norm replacing L2 norm, by removing the kernel mask term and by reducing the repetitive computation, as comparing with the conventional method.

Figure 5:
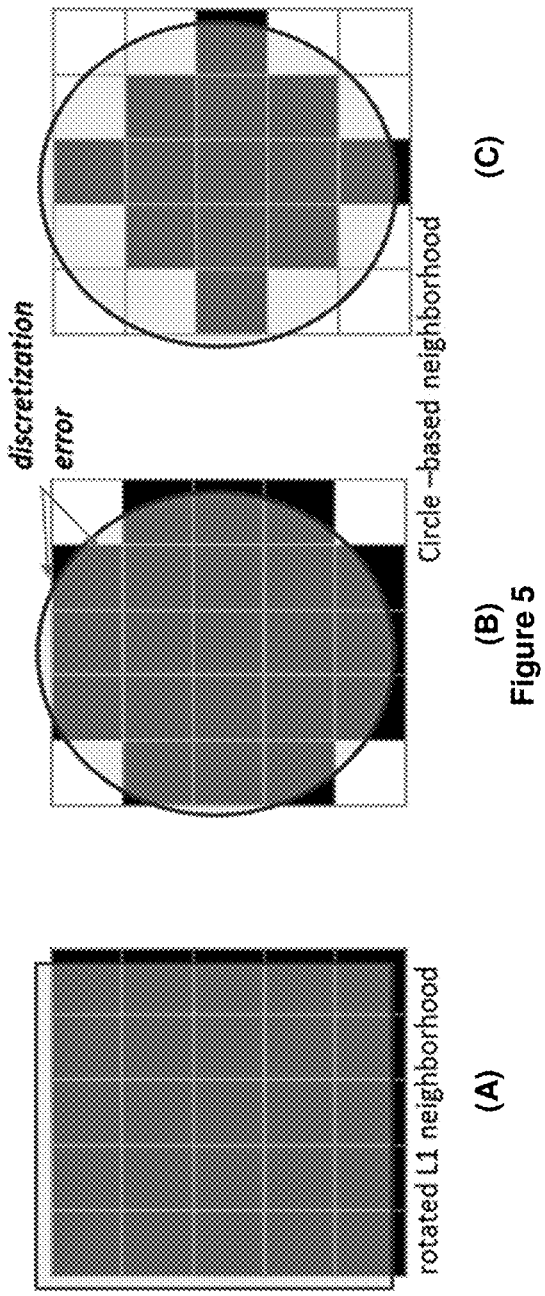
FIG. 5 illustrates an error comparison between the claimed method (A) and the conventional methods (B)-(C)

The advantages of the current invention mainly include two aspects. Firstly, the error caused by discretization could be reduced, as comparing with the conventional method. FIG. 5 illustrates an error comparison between the claimed method and the conventional method. As shown on FIG. 5A, since the neighborhood mask is a square shape, all the pixels inside the mask could be wholly included and fine matched with the mask. However, as shown on FIGS. 5B and 5C, since the neighborhood mask is in circle, the pixels at the edge of the mask cannot be included and that will cause discretization error.

Secondly, since the computation complexity is decreased, the processing time could be shortened. Furthermore, since the new neighborhood mask is more regular, memory alignment could be achieved for high speed data accessing; advanced computer instructions can be easily applied, e.g., MMX/SSE3/NEON; advanced computational architecture can be easily applied, e.g., GPUs/Multi-cores processing/DSP.

Figure 6:
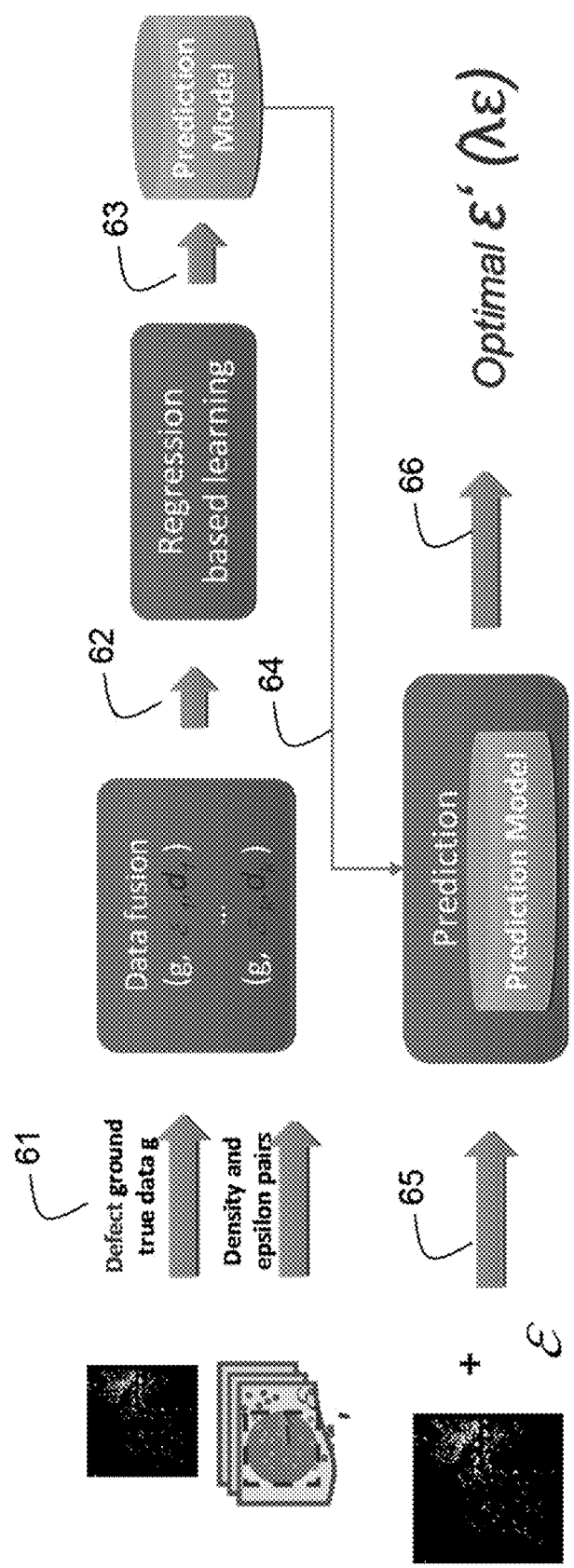
FIG. 6 shows a flowchart of the machine learning based optimization method, in accordance with one embodiment of the present invention.

In one embodiment, the neighborhood value $\epsilon$ should determine an optimal value to enhance the final performance such as accuracy and detection speed. A machine learning based optimization could be used for the neighborhood construction. FIG. 6 shows a flowchart of the machine learning based optimization method, in accordance with one embodiment. Firstly the parameters defect ground true data g and density and epsilon pairs (di, $\epsilon$i) are input into a data fusion unit for data fusion in the step 61. The output data from the data fusion unit is then learned by a regression based learning module in the step 62 for creating learning models in the step 63 and building a database for the models in the step 64.

During the operation, the parameters of the binary matrix with a preliminarily defined neighborhood value $\epsilon$ could be inputted into a prediction model unit to predict a proper model based on the learning models stored in the database in the step 65. Based on the prediction model, an optimal neighborhood value $\epsilon'$ could be determined in the step 66.

Figure 7:
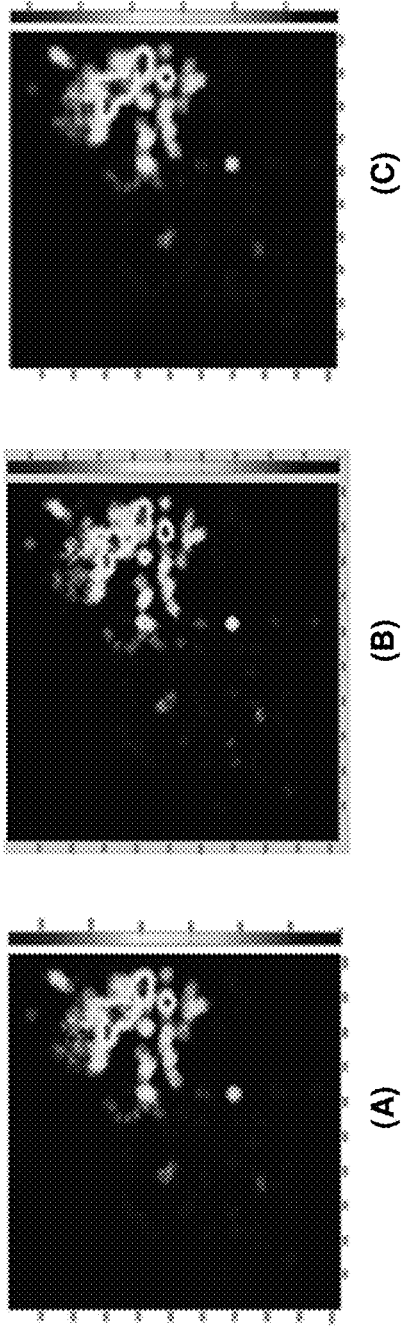
FIG. 7 shows density estimation results by using different estimation methods (A)-(C)

FIG. 7 shows density estimation result by using different estimation methods. As shown in FIG. 7A, the defect density map is the estimation result by the traditional approach with circle mask. As shown in FIG. 7B, the defect density map is a neighborhood approach with the first neighborhood mask as described above. As shown in FIG. 7C, the defect density map is a neighborhood approach with the second neighborhood mask as described above. Apparently, the defect density map of the FIG. 7C is more accurate than the other two.

Figure 8:
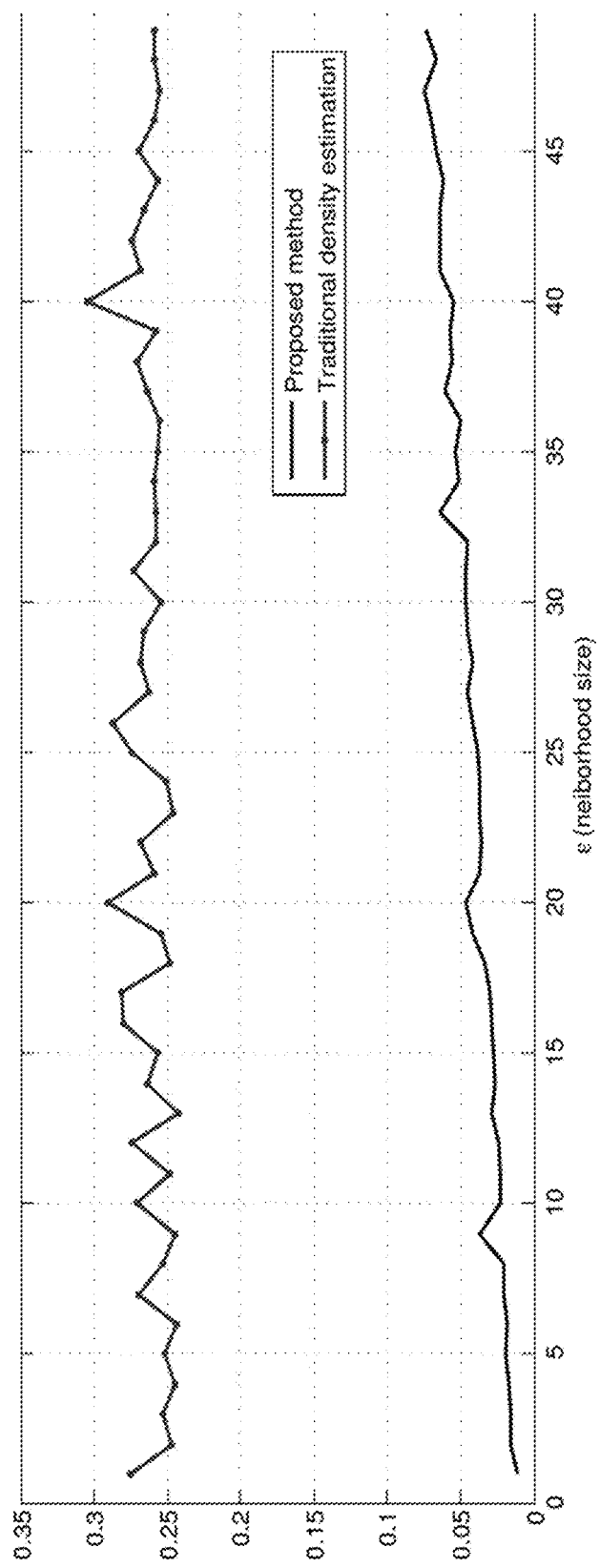
FIG. 8 shows comparison of time for defect density estimation between the traditional estimation method and the present invention.

FIG. 8 shows a comparison of time for defect density estimation between traditional estimation method and the current invention. As shown in FIG. 8, the dotted line represents for traditional window searching based method, and the flat line represents for the proposed method of the present invention. As clearly shown from the FIG. 8, the proposed method of the present invention is much quicker than the traditional method.

According to the present invention, a defect density estimation method with a new neighborhood mask to estimate the defect density for a captured image of the object is defined to enhance the accuracy and efficiency of defect density estimation.

The embodiments disclosed herein may be implemented using a general purpose or specialized computing device, computer processor, or electronic circuitry including but not limited to a digital signal processor (DSP), application specific integrated circuit (ASIC), a field programmable gate array (FPGA), and other programmable logic device configured or programmed according to the teachings of the present disclosure. Computer instructions or software codes running in the general purpose or specialized computing device, computer processor, or programmable logic device can readily be prepared by practitioners skilled in the software or electronic art based on the teachings of the present disclosure.

In some embodiments, the present invention includes a computer storage medium having computer instructions or software codes stored therein which can be used to program a computer or microprocessor to perform any of the processes of the present invention. The storage medium can include, but is not limited to, floppy disks, optical discs, Blu-ray Disc, DVD, CD-ROMs, and magneto-optical disks, ROMs, RAMs, flash memory devices, or any type of media or device suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for inspecting one or more defects of an object by using defect density estimation, the method comprising:
    capturing one or more images of the object;
    estimating defect response from the one or more captured images;
    generating, from the defect response estimated from the one or more images of the object, a binary matrix comprising one or more defect elements;
    determining a first neighborhood mask for each target pixel of the binary matrix, wherein a first neighborhood mask for a respective target pixel of the binary matrix is determined based on a predetermined neighborhood distance with respect to the respective target pixel;
    determining a second neighborhood mask for each target pixel of the binary matrix, wherein a second neighborhood mask for a respective target pixel of the binary matrix is determined by rotating the first neighborhood mask for the respective target pixel through a predetermined angle;
    determining a density of defect elements of the binary matrix within a second neighborhood mask corresponding to each target pixel of the binary matrix; and
    determining the one or more defects of the object based on the determined density of defect elements of the binary matrix for each target pixel.

2. The method of claim 1, wherein each of the one or more captured images is a 2-dimension gray intensity image, a color image, a depth image, or a binary image.

3. The method of claim 1, wherein the binary matrix is generated by a thresholding method.

4. The method of claim 3, wherein the thresholding method includes a method, which converts a matrix to a binary matrix.

5. The method of claim 3, wherein the thresholding method includes an adaptive thresholding method or a traditional thresholding method.

6. The method of claim 1, wherein each of the one or more defect elements is a non-zero element.

7. The method of claim 1, wherein each of the one or more defect elements is a zero element.

8. The method of claim 1, wherein the first neighborhood mask is a first L1 epsilon-ball neighborhood mask.

9. The method of claim 1, wherein the predetermined neighborhood distance is a Manhattan distance between the respective target pixel and any point at an edge of the first neighborhood mask for the respective target pixel.

10. The method of claim 1, wherein the predetermined neighborhood distance is an optimal neighborhood radius calculated based on input defect image data of the object and a prediction model.

11. The method of claim 10, wherein the prediction model is determined by conducting a data-fusion process and a regression based learning process.

12. The method of claim 1, wherein the predetermined neighborhood distance is an optimal neighborhood radius determined through a machine learning based process.

13. The method of claim 12, wherein the machine learning based process comprises:
    conducting a data-fusion process and a regression based learning process to generate a prediction model; and
    calculating the optimal neighborhood radius based on data of the one or more captured images and the prediction model.

14. The method of claim 1, wherein the predetermined angle is an angle of 45 degree, 135 degree, 225 degree, or 315 degree.

15. The method of claim 1, wherein the density of defect elements of the binary matrix is determined by counting the defect elements of the binary matrix.

16. The method of claim 1, further comprising:
    generating a defect density map based on the determined density of defect elements of the binary matric for determining the defects of the object.

17. The method of claim 16, further comprising:
    classifying noise of the one or more captured images from the defect density map to output a defect image.

18. The method of claim 1, further comprising:
    classifying defect pixels and noise pixels from the one or more captured images based on the determined density of defect elements of the binary matrix to output a defect image; and
    post-processing the defect image with one or more morphological operations or blob filtering in terms of a geometric size, an area of connected pixels, or an aspect to reduce the noise pixels.

19. The method of claim 18, wherein the one or more morphological operations include eroding, dilating, opening, and/or closing in digital image processing context.

20. The method of claim 18, wherein the step of classifying the defect pixels and the noise pixels is done with one or more defect density images based on the determined density of defect elements of the binary matrix.

* * * * *

UNITED STATES PATENT AND TRADEMARK OFFICE
CERTIFICATE OF CORRECTION

PATENT NO. : 9,846,929 B2
APPLICATION NO. : 15/079062
DATED : December 19, 2017
INVENTOR(S) : Weiwen Zou Page 1 of 1

It is certified that error appears in the above-identified patent and that said Letters Patent is hereby corrected as shown below:

In the Claims

At Column 8, Claim number 16, Line number 34, delete "matric" and replace with --matrix--.

Signed and Sealed this
Thirty-first Day of July, 2018

Andrei Iancu
*Director of the United States Patent and Trademark Office*